(12) United States Patent
Shah et al.

(10) Patent No.: US 8,510,527 B1
(45) Date of Patent: Aug. 13, 2013

(54) SYSTEM AND METHODS FOR MIGRATING INFORMATION FROM SOURCE STORAGE TO DESTINATION STORAGE

(75) Inventors: Bhavik Shah, Ahmedabad (IN); Shishir Shah, Irvine, CA (US)

(73) Assignee: QLOGIC, Corporation, Aliso Viejo, CA (US)

( * ) Notice: Subject to any disclaimer, the term of this patent is extended or adjusted under 35 U.S.C. 154(b) by 406 days.

(21) Appl. No.: 12/901,409

(22) Filed: Oct. 8, 2010

(51) Int. Cl.
*G06F 12/00* (2006.01)
*G06F 13/00* (2006.01)

(52) U.S. Cl.
USPC ........... 711/165; 711/154; 711/161; 711/162; 711/170; 711/173; 711/E12.002

(58) Field of Classification Search
USPC .................. 711/154, 173, E12.002, 165, 161, 711/162, 170
See application file for complete search history.

(56) References Cited

U.S. PATENT DOCUMENTS

2009/0089534 A1* 4/2009 Zohar et al. ................... 711/173

* cited by examiner

*Primary Examiner* — Midys Rojas
(74) *Attorney, Agent, or Firm* — Klein, O'Neill & Singh, LLP

(57) ABSTRACT

Method and system for migrating information from a source storage device to a destination storage device via a router is provided. The method includes selecting the source storage device for migrating information from; selecting a destination storage device and concluding upon validation that the destination storage device is configured to operate as a thin provisioned storage device for storing information; and reading information from the source storage device and if the read information is zero, then reading a corresponding segment of the destination storage device and if non-zero information is read from the corresponding segment, then setting an indicator for indicating that the destination storage device is not configured as the thin provisioned storage device.

15 Claims, 4 Drawing Sheets

SYSTEM AND METHODS FOR MIGRATING INFORMATION FROM SOURCE STORAGE TO DESTINATION STORAGE

TECHNICAL FIELD

The present invention relates to network and storage systems.

BACKGROUND

Computing systems commonly use a storage array with a plurality of mass storage devices to store information. The storage array is typically managed by a target controller (or a computing system) that interfaces with a storage server. The storage server receives user input/output (I/O) requests for reading and writing information. The storage server interfaces with the target controller to respond to I/O requests.

Storage space is typically managed as a logical entity, for example as a logical unit number (LUN). Typically, LUNs are presented to a host system by the target controller. The host system then uses the LUNs to read and write information to physical storage devices. Information may be written in blocks that are allocated for the LUNs.

Typically when a LUN is configured, a user specifies the size of the LUN, for example, X Gb. In some instances, the target controller does not reserve X Gb of actual physical storage when the LUN is configured. Instead, the target controller may reserve storage space that is less than X Gb. A block allocation map is used to manage the number of blocks that are actually assigned to the LUN. The target controller adds capacity to the reserved space when it receives an input/output request. This allows the target controller to advertise more storage space than it actually has. This concept is referred to as Thin Provisioning, which means that the actual storage space for a LUN is less than what is advertised.

Information may be migrated from a source LUN to a destination LUN using a migration device/application. Conventional migration techniques are not able to take advantage of thin provisioning because of at least the following reasons: the block level migrating device/application typically is unaware of a block allocation map of thin provisioned LUN. The migrating device/application may also be unaware of a file system or any other application data format. Often the full capacity of the source LUN is not utilized by an application and/or a file system that manages the LUN. However, when the migrating device migrates the source LUN it copies the full capacity of the source LUN to the destination LUN forcing the destination LUN to allocate all the blocks equal to the entire capacity of the source LUN. This results in the migration process overriding the advantages of thin provisioning. It is desirable to use the advantages of thin provisioning for a migration operation and continuous efforts are being made towards that.

SUMMARY

The various embodiments of the present system and methods have several features, no single one of which is solely responsible for their desirable attributes. Without limiting the scope of the present embodiments as expressed by the claims that follow, their more prominent features now will be discussed briefly. After considering this discussion, and particularly after reading the section entitled "Detailed Description" one will understand how the features of the present embodiments provide advantages, which include how to migrate source LUNs to destination LUNs.

In one embodiment, a machine implemented method for migrating information from a source storage device to a destination storage device via a router is provided. The method comprises selecting the source storage device for migrating information from; selecting a destination storage device and concluding upon validation that the destination storage device is configured to operate as a thin provisioned storage device for storing information. The method further includes reading information from the source storage device and if the read information is zero, then reading a corresponding segment of the destination storage device and if non-zero information is read from the corresponding segment, then setting an indicator for indicating that the destination storage device is not configured as the thin provisioned storage device. In one embodiment, the router reads the information from the source storage device and the corresponding segment of the destination storage device.

In another embodiment, a system is provided. The system comprises a computing system having access to a source storage device via a router; and a destination storage device for storing information that is migrated from the source storage device. The router is coupled to the source storage device and the destination storage device and facilitates migration from the source storage device to the destination storage device.

When the destination storage device is selected for migration it is presumed without validation to be configured to operate as a thin provisioned storage device for storing information and when non-zero information is read from the source storage device it is written by the router to the destination storage device.

In yet another embodiment, a router is provided. The router is operationally coupled to a source storage device and a destination storage device for storing information that is migrated from the source storage device to the destination storage device. The router includes a processor executing code out of a memory for receiving information from the source storage device and if the received information is zero, then reading a corresponding segment of the destination storage device and if non-zero information is read from the corresponding segment, then setting an indicator in the memory indicating that the destination storage device is not configured as the thin provisioned storage device.

This brief summary has been provided so that the nature of the disclosure may be understood quickly. A more complete understanding of the disclosure can be obtained by reference to the following detailed description of the preferred embodiments thereof concerning the attached drawings.

BRIEF DESCRIPTION OF THE DRAWINGS

The foregoing features and other features of the present disclosure will now be described with reference to the drawings of the various embodiments. In the drawings, the same components have the same reference numerals. The illustrated embodiments are intended to illustrate, but not to limit the disclosure. The drawings include the following Figures.

DETAILED DESCRIPTION

Figure 1:
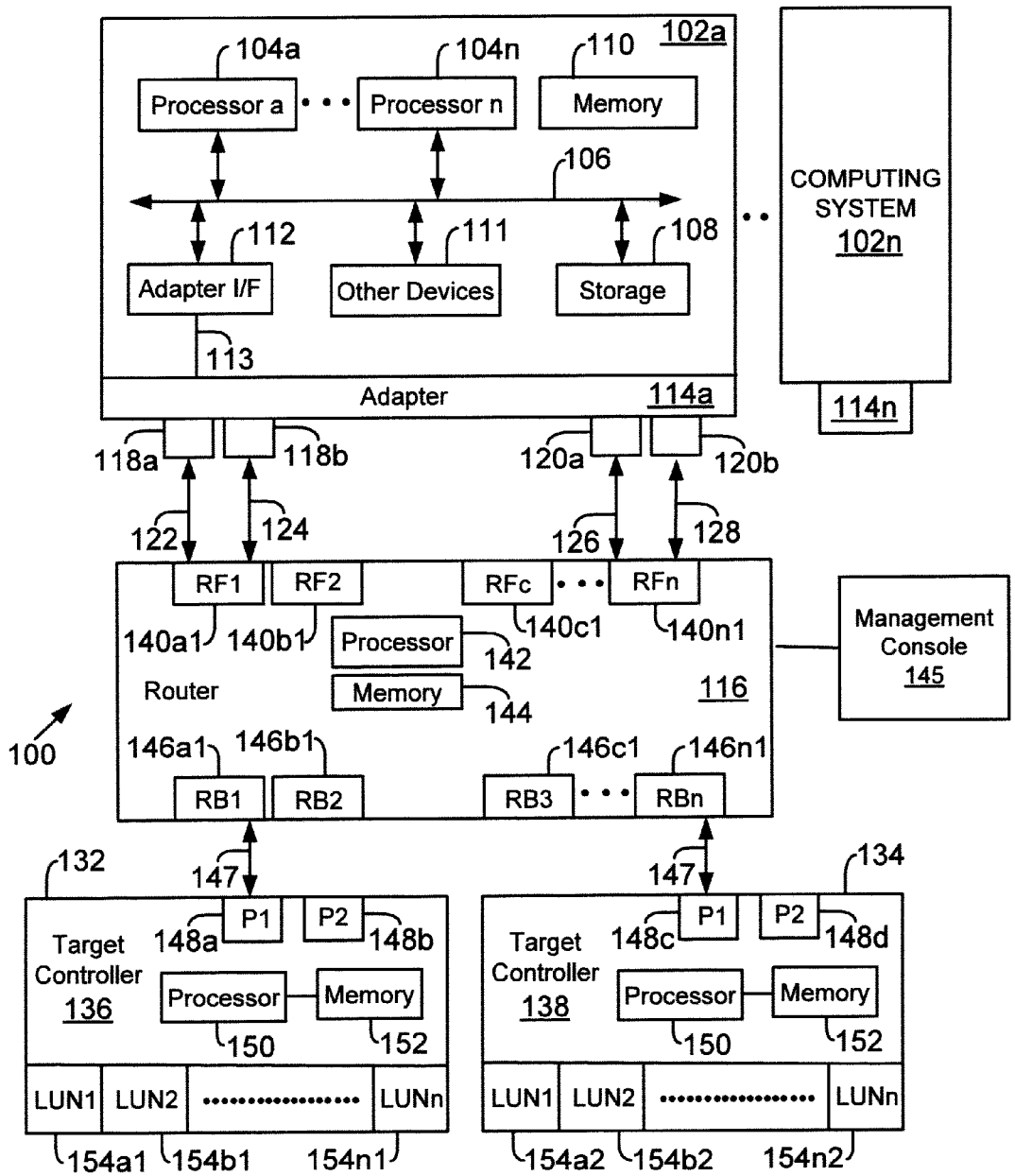
FIG. 1 is a block diagram of a system used according to one embodiment.

The following detailed description describes the present embodiments with reference to the drawings. In the drawings, reference numbers label elements of the present embodiments. These reference numbers are reproduced below in connection with the discussion of the corresponding drawing features.

As a preliminary note, any of the embodiments described with reference to the figures may be implemented using software, firmware, hardware (e.g., fixed logic circuitry), manual processing, or a combination of these implementations. The terms "logic", "module", "component", "system", and "functionality" as used herein, generally represent software, firmware, hardware, or a combination of these elements. For instance, in the case of a software implementation, the terms "logic", "module", "component", "system", and "functionality" represent program code that performs specified tasks when executed on a processing device or devices (e.g., CPU or CPUs). The program code can be stored in one or more computer readable memory devices.

More generally, the illustrated separation of logic, modules, components, systems, and functionality into distinct units may reflect an actual physical grouping and allocation of software, firmware, and/or hardware, or may correspond to a conceptual allocation of different tasks performed by a single software program, firmware program, and/or hardware unit. The illustrated logic, modules, components, systems, and functionality may be located at a single site (e.g., as implemented by a processing device), or may be distributed over a plurality of locations.

The term "machine-readable media" and the like refers to any kind of medium for retaining information in any form, including various kinds of storage devices (magnetic, optical, static, etc.). Machine-readable media also encompasses transitory forms for representing information, including various hardwired and/or wireless links for transmitting the information from one point to another.

The embodiments disclosed herein, may be implemented as a computer process (method), a computing system, or as an article of manufacture, such as a computer program product or computer-readable media. The computer program product may be computer storage media readable by a computer device, and encoding a computer program of instructions for executing a computer process. The computer program product may also be a propagated signal on a carrier, readable by a computing system, and encoding a computer program of instructions for executing a computer process.

FIG. 1 is a block diagram of a system 100 including a plurality of computing systems 102a-102n (may also be referred to as host system 102a-102n or individually as host system 102) coupled to one or more adapters 114a-114n (may be referred to as adapter 114) that interface with a plurality of storage arrays 132, 134 via a router 116. In some embodiments, storage array 132 may be referred to as a source array and storage array 134 may be referred to as a destination array. Storage array 132 includes a target controller 136, while storage array 134 includes a target controller 138. There may be other systems/components that may be placed between the aforementioned components but they are not germane to the embodiments disclosed herein.

The host system 102a may include one or more processors 104a-104n (jointly referred to as processor 104), also known as a central processing unit (CPU), interfacing with other components via a bus 106. Bus 106 may be, for example, a system bus, a Peripheral Component Interconnect (PCI) bus (or PCI Express bus), a HyperTransport or industry standard architecture (ISA) bus, a SCSI bus, a universal serial bus (USB), an Institute of Electrical and Electronics Engineers (IEEE) standard 1394 bus (sometimes referred to as "Firewire"), or any other kind of bus.

The host system 102a may include a mass storage device 108, which may be for example a hard disk, a CD-ROM, a non-volatile memory device (flash or memory stick) or any other device. Storage 108 may store processor executable instructions and data, for example, operating system program files, application program files, and other files. Some of these files are stored on storage 108 using an installation program. For example, the processor 104a may execute computer-executable process steps of an installation program so that the processor 104a can properly execute the application program.

Host system 102a interfaces with memory 110 that may include random access main memory (RAM), and/or read only memory (ROM). When executing stored computer-executable process steps from storage 108, the processor 104a may store and execute the process steps out of memory 110. ROM may store invariant instruction sequences, such as start-up instruction sequences or basic input/output operating system (BIOS) sequences for operation of a keyboard (not shown).

The host system 102a may also include other devices and interfaces 111, which may include a display device interface, a keyboard interface, a pointing device interface and others.

Host system 102a may also include an adapter interface 112 that allows the host system to interface with adapter 114a, as described below. The link 113 between adapter 114a and adapter interface 112 may be a peripheral bus, for example, a PCI, PCI-X or PCI-Express link. The adapter may be configured to handle both network and storage traffic using various network and storage protocols to handle network and storage traffic. Some common protocols are described below.

One common network protocol is Ethernet. The original Ethernet bus or star topology was developed for local area networks (LAN) to transfer data at 10 Mbps (mega bits per second). Newer Ethernet standards (for example, Fast Ethernet (100 Base-T) and Gigabit Ethernet) support data transfer rates between 100 Mbps and 10 gigabit (Gb). The description of the various embodiments described herein is based on using Ethernet (which includes 100 Base-T and/or Gigabit Ethernet) as the network protocol. However, the adaptive embodiments disclosed herein are not limited to any particular protocol, as long as the functional goals are met by an existing or new network protocol.

One common storage protocol used to access storage systems is Fibre Channel. Fibre channel is a set of American National Standards Institute (ANSI) standards that provide a serial transmission protocol for storage and network protocols such as HIPPI, SCSI, IP, ATM and others. Fibre channel supports three different topologies: point-to-point, arbitrated loop and fabric. The point-to-point topology attaches two devices directly. The arbitrated loop topology attaches devices in a loop. The fabric topology attaches host systems directly (via HBAs) to a fabric, which are then connected to multiple devices. The Fibre Channel fabric topology allows several media types to be interconnected.

Fibre Channel fabric devices include a node port or "N_Port" that manages Fabric connections. The N_port establishes a connection to a Fabric element (e.g., a switch) having a fabric port or F_port.

A new and upcoming standard, called Fibre Channel Over Ethernet (FCOE) has been developed to handle both Ethernet and Fibre Channel traffic in a storage area network (SAN). This functionality would allow Fibre Channel to leverage 10 Gigabit Ethernet networks while preserving the Fibre Channel protocol. The adapter 114 shown in FIG. 1A may be configured to operate as a FCOE adapter and may be referred to as FCOE adapter 114. QLogic Corporation, the assignee of the present application, provides one such adapter. Those of ordinary skill in the art will appreciate, however, that the present embodiments are not limited to any particular protocol. The illustrated FCOE adapter 114 is merely one example of a converged network adapter that may leverage the advantages of the present embodiments.

Another common protocol that may be used by adapter 114 is the iSCSI protocol. The iSCSI standard is based on Small Computer Systems Interface ("SCSI") which enables host computer systems to perform block data input/output ("I/O") operations with a variety of peripheral devices including disk and tape devices, optical storage devices, as well as printers and scanners. A traditional SCSI connection between a host system and peripheral device is through parallel cabling and is limited by distance and device support constraints. For storage applications, iSCSI was developed to take advantage of network architectures based on Fibre Channel and Gigabit Ethernet standards. iSCSI leverages the SCSI protocol over established networked infrastructures and defines the means for enabling block storage applications over TCP/IP networks. iSCSI defines mapping of the SCSI protocol with TCP/IP.

Referring back to FIG. 1, Adapter 114*a* may include a plurality of ports 118*a*/118*b* and 120*a* and 120*b* to communicate with other devices for example, router 116 and storage arrays 132 and 134. The adapter ports include logic and hardware to handle both network and storage traffic.

Router 116 includes a processor 142 that executes programmable instructions (for example, firmware and the executable instructions for implementing the processes disclosed herein) out of memory 144 to control router 116 operations.

Router 116 may also include a plurality of front end ports (RF1-RFn) 140*a*1-140*n*1 that interface with adapter 114*a* via links 122, 124, 126 and 128. Ports 140*a*1-140*n*1 receive input/output requests from host systems and send data to/from storage array 132 and 134.

Router 116 may also include a plurality of back end ports (RB1-RBn) 146*a*1-146*n*1 that interface with target ports of target controllers 136 and 138 via links 147. For example, back end port RB1 146*a*1 of router 116 interfaces with target port P1 148*a* of target controller 136. Back end port RBn 146*n*1 of router 116 interfaces with target port P1 148*c* of target controller 138.

It is noteworthy that the router and the various embodiments described herein are not limited to any particular number of ports.

Target controllers 136 and 138 may also include a processor 150 for executing programmable instructions out of memory 152, for example firmware instructions. Processor 150 controls overall target controller operations. For example, processor 150 may process host system I/O requests.

Storage array 132 and 134 include a plurality of storage devices (not shown). Target controller 136 and 138 present a physical representation of storage devices as a logical structure, for example, a LUN. Each LUN has a unique identifier and unique attributes. A host system processor that wants to read or write data accesses the presented LUN. FIG. 1 shows a plurality of LUNs 154*a*1-154*n*1 for storage array 132 and LUNs 154*a*2-154*n*2 of storage array 134 that are presented to host system 102*a*. Information stored at LUNs 154*a*1-154*n*1 can be migrated to LUNs 154*a*2-154*n*2 as described below in more detail.

System 100 may also include a management console 145. Management console 145 may be a stand-alone desktop computer, a laptop, a notebook computer or any other computing device that executes a management application for configuring and managing devices of system 100. For example, a user using management console 145 may configure router 116 and LUNs 154*a*1-154*n*1/154*a*2-154*n*2. Management console 145 may also be used for configuring and generating a migration request for migrating information from a source LUN (for example, 154*a*1) to a destination LUN (for example, 154*a*2).

Figure 2:
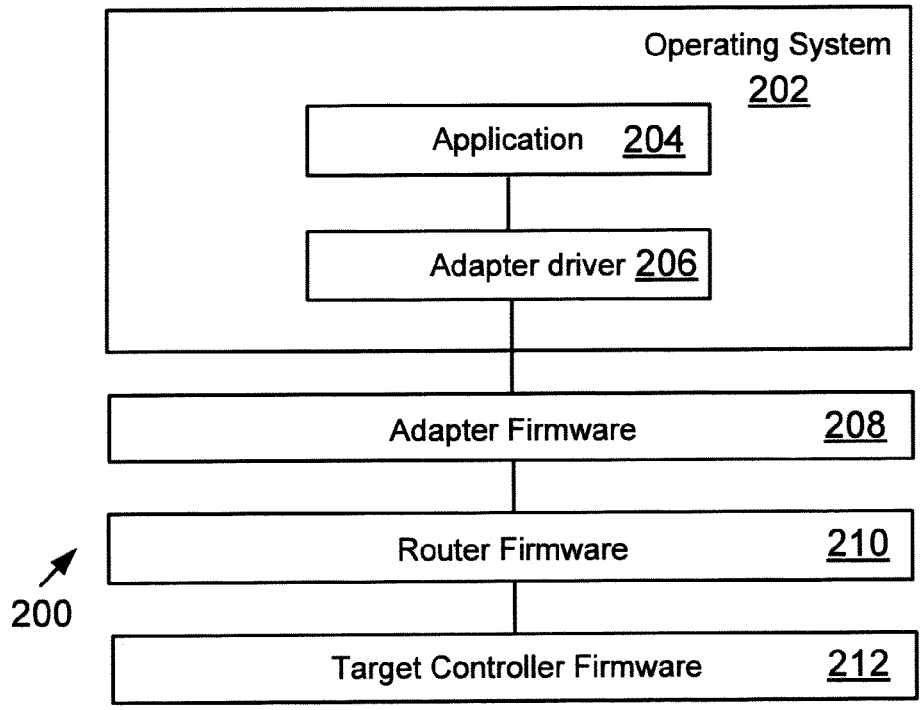
FIG. 2 is a block diagram showing an architecture that can be used by the embodiments disclosed herein.

Architecture:

FIG. 2 shows a block diagram of a system 200 that may be used to access storage in system 100. System 200 includes an operating system (for example, a Windows based Operating System, a Linux based system and others) 202 that is executed by host system 102*a*. Application 204 is executed by host system 102*a* processor 104 executing programmable instructions out of memory 110. Application 204 may be used to send I/O requests to access storage, i.e. for reading and writing information. To process I/O requests from the host 102*a*, adapter driver 206 interfaces with adapter firmware (not shown).

Router firmware 210 is executed by router processor 142 to control router 116 operations and target controller firmware 212 is executed by target controller processor 150 to control the target controller 136 operations.

Although the system architecture has been described with reference to a router 116, target controller 136 and storage array 132, system operation may be similar for target controller 138 and storage array 134.

Figure 3:
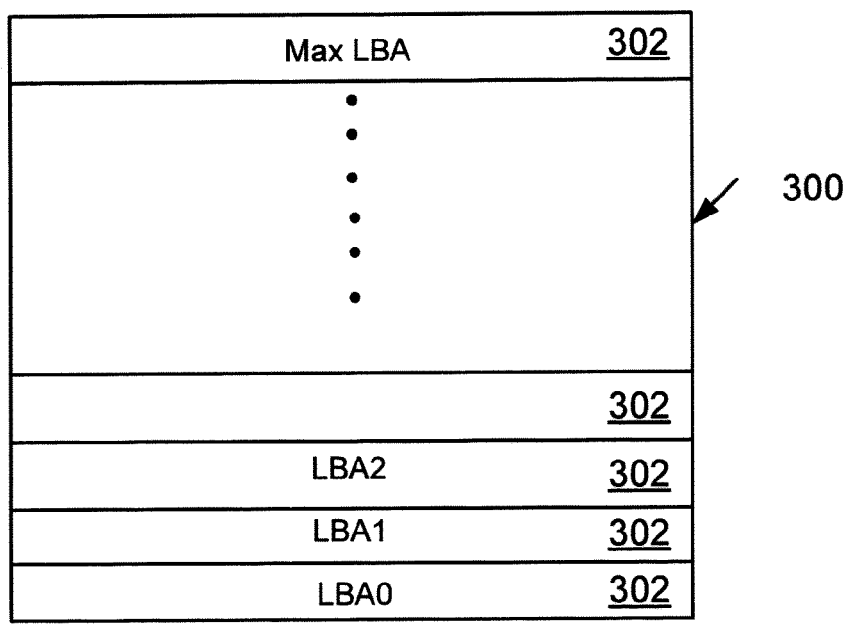
FIG. 3 shows an example of a LUN.

Now referring to FIG. 3, a LUN, for example, LUN 300 is described. LUNs 154*a*1-154*an* of storage array 132 and LUNs 154*a*2-154*n*2 of storage array 134 may be similar to LUN 300. LUN 300 includes a plurality of storage blocks 302. Each storage block 302 is addressable by a logical block address (LBA), for example LBA0 to Max LBA, and each storage block 302 stores information.

When a portion of data is written or read from a LUN, a start LBA and size of transfer is provided. Start LBA defines the start of the address of the LBA and size defines the number of storage blocks to be read or written. In some embodiments, an offset value may also be provided, which will be added to the start LBA to jump to the first storage block to be read or written. As an example, host system 102*a* may provide the LBA, size of transfer and data (for a write operation) to target controller 132. Then, a plurality of LBA's starting with the start LBA is read or written by the target controller.

According to an embodiment of this disclosure, router 116 may be used to initiate migration of data from a source LUN of a source array to a destination LUN of a destination array. For example, information from LUN1 154*a*1 of storage array 132 can be migrated to LUN2 154*b*2 of storage array 134. The process flow diagrams below describe the migration in detail.

Figure 4:
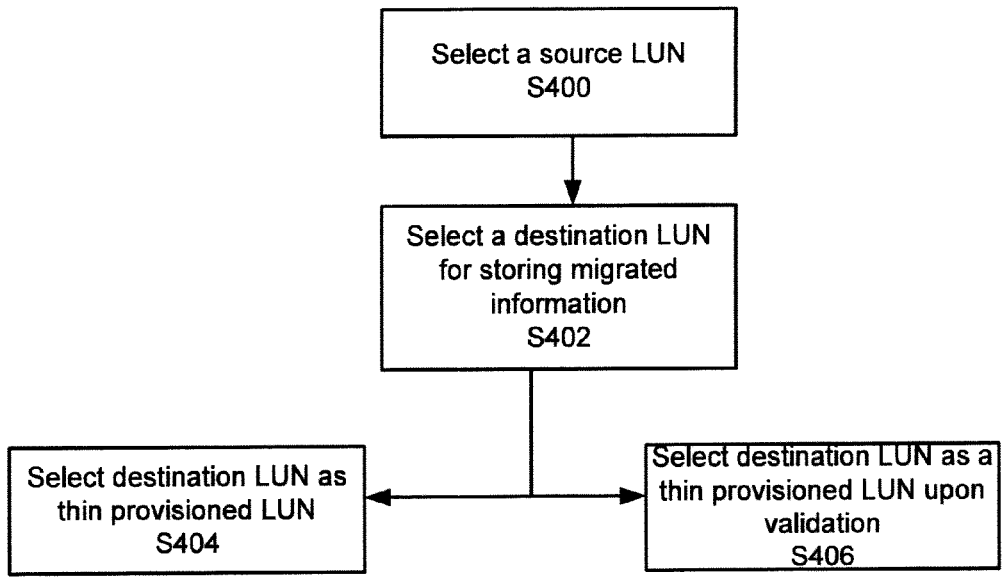
FIGS. 4-6 show process flow diagrams, according to one embodiment.

Process Flow:

FIG. 4 shows a process flow diagram for configuring a migration operation for migrating information from a source LUN to a destination LUN, according to one embodiment. The process begins in block S400 when a source LUN is selected for migration. In one embodiment, the source LUN is selected via a user interface from a management console or any other computing device.

In block S402, the destination LUN is selected for storing the migrated information. In one embodiment, the destination LUN is selected via a user interface from a management console or any other computing device. In block S404, the destination is selected as a "thin provisioned" LUN. The user assumes that the destination LUN is thin provisioned. However, in block S406, the user may select the destination LUN as a thin provisioned LUN upon validation. The validation process is described below in more detail.

It is noteworthy that blocks S404 and S406 are optional, i.e., the user may opt to use the destination LUN as a thin provisioned LUN (S404) or assume that the destination LUN is a thin provisioned LUN and validate the assumption.

Figure 5:
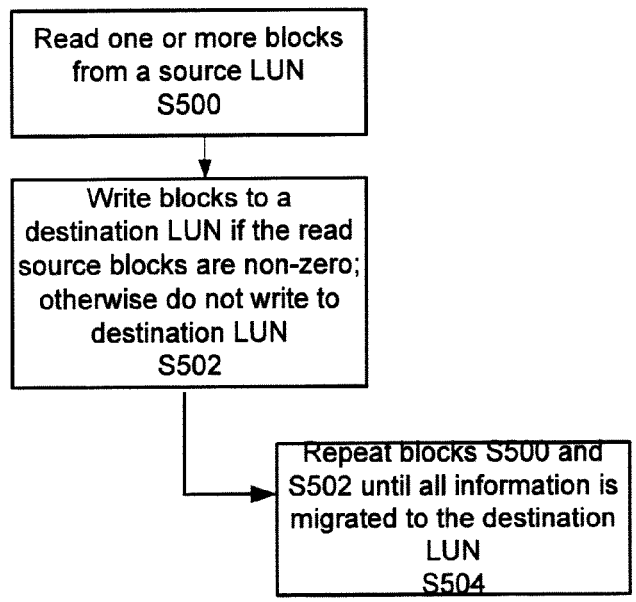

FIG. 5 is a process flow diagram for migrating information from a source LUN to a destination LUN that is presumed to be a thin provisioned LUN where a read operation from unallocated blocks returns a value of zeros. This process flow diagram is based on selecting block S404 in FIG. 4. The process begins in block S500 when data is read from the source LUN. In block S502, the process evaluates the data from the source LUN. If the data is non-zeros, then it is written to the destination LUN. If the data that is read is all zeros, then it is not written to the destination LUN that is presumed to be a thin provisioned LUN. In block S504, the process is then repeated for blocks S500 and S502, until all the source LUN blocks have been read and migrated.

It is noteworthy that the process blocks of FIG. 5 are executed by router 116. In one embodiment, processor 142 executing programmable instructions out of memory 144 executes the foregoing process blocks.

Figure 6:
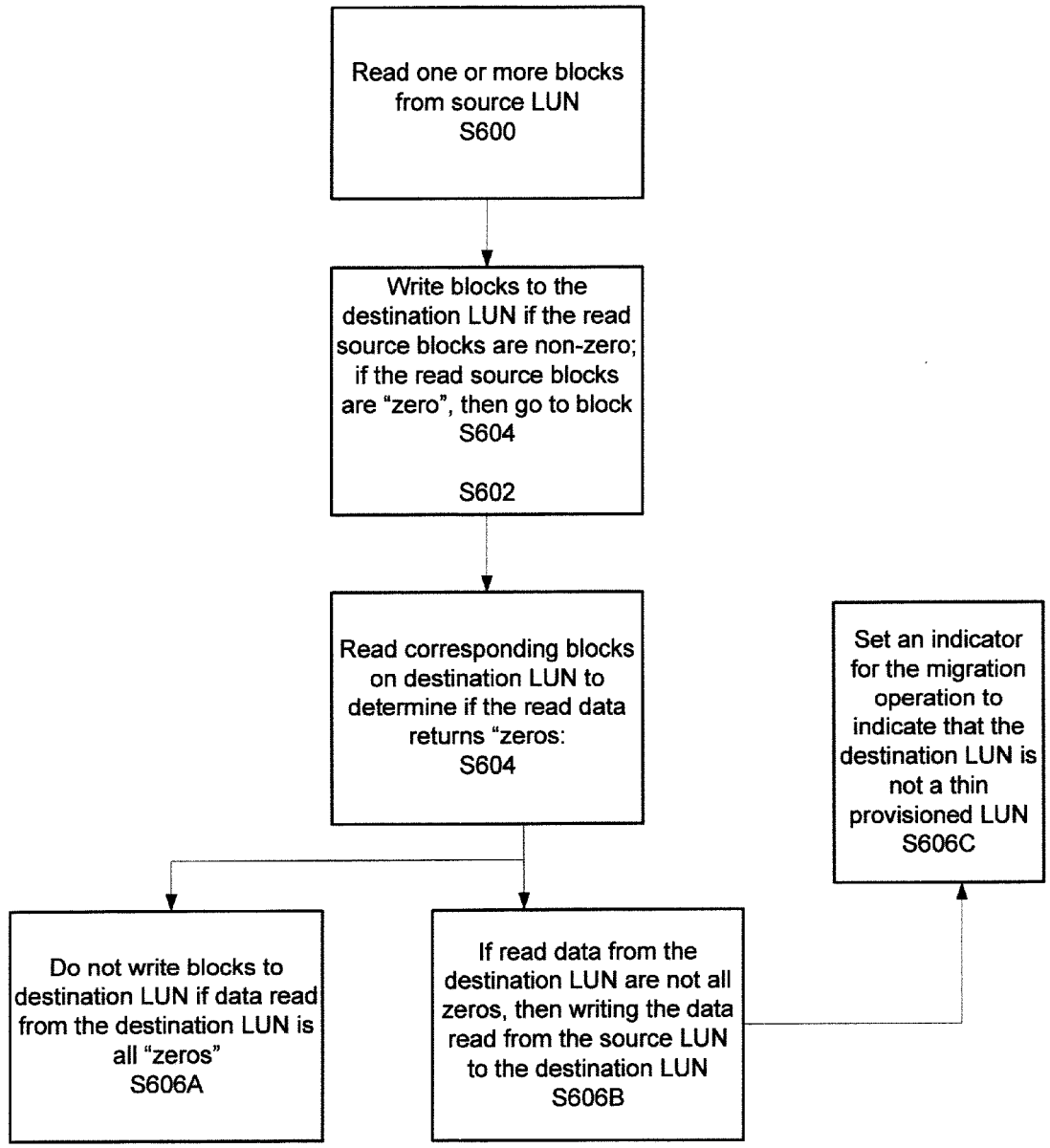

In the process flow of FIG. 5, one does not know if the destination LUN complies with the common practice of thin provisioning where it is presumed that data read from unallocated LUN is all "zeros". The user may select option S404 of FIG. 4 and migrate data assuming that the destination LUN is a thin provisioned LUN. The user may also select block S406, to validate the thin provisioned nature of the destination LUN. The validation process is described below with respect to FIG. 6.

The process starts in block S600 when one or more blocks are read from a source LUN (for example, 154a1). Router 116 may be used to perform this process block. If the read block(s) is non-zero, then it is written to the destination LUN. If the read block is all zeros, then the process moves to block S604.

In block S604, the blocks corresponding to the source LUN are read by router 116. The corresponding LUN is the LUN where the source LUN is migrated. In this example, the destination LUN corresponding to the source LUN 154a1 may be 154a2.

If all the data that is read from the corresponding LUN is zero, then in block S606A, nothing is written to the destination LUN. If the data read from the destination LUN is non-zero, then data is written to the destination LUN in block S6068. Thereafter, in block S606C, a flag (or an indicator) is set indicating that the destination LUN is not configured to operate as a "thin provisioned LUN". After the flag is set, router 116 does not look for blocks of "zeros" when it reads from a source LUN. This flag is maintained at router memory 144 for a specific migration operation.

The embodiments disclosed herein have various advantages. For example, if it is determined that the destination LUN is not configured as a thin provisioned LUN as discussed above, then the migration operation is performed efficiently because the router does not check for "zeros". Furthermore, the advantages of using a thin provisioned LUN are retained at the destination LUN after migration.

Although the present disclosure has been described with reference to specific embodiments, these embodiments are illustrative only and not limiting. Many other applications and embodiments of the present invention will be apparent in light of this disclosure and the following claims. References throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics being referred to may be combined as suitable in one or more embodiments of the invention, as will be recognized by those of ordinary skill in the art.

What is claimed is:

1. A machine implemented method for migrating information from a source storage device to a destination storage device via a router, comprising:

selecting the source storage device for migrating information from;

selecting a destination storage device and concluding upon validation that the destination storage device is configured to operate as a thin provisioned storage device for storing information; and reading information from the source storage device and if the read information is zero, then reading a corresponding segment of the destination storage device and if non-zero information is read from the corresponding segment, then setting an indicator for indicating that the destination storage device is not configured as the thin provisioned storage device; wherein the router reads the information from the source storage device and the corresponding segment of the destination storage device.

2. The method of claim 1, further comprising:

writing non-zero information read from the source storage device to the destination storage device.

3. The method of claim 1, wherein if the information read from the corresponding segment of the destination storage device is all zeros, then no information is written to the destination storage device and the destination storage device configuration as a thin provisioned storage device is validated by the router.

4. The method of claim 1, wherein the selected destination storage device is assumed to be a thin provisioned storage device without validation and non-zero information read from the source storage device is written to the destination storage device by the router.

5. The method of claim 4, wherein when information that is read from the source storage device is zeroes, then the zeroes are not written to the destination storage device by the router.

6. The method of claim 1, wherein the source storage device and the destination storage device are presented as a logical unit number (LUN) for reading and writing information.

7. A system, comprising:

a computing system having access to a source storage device via a router; and a destination storage device for storing information that is migrated from the source storage device; wherein the router coupled to the source storage device and the destination storage device facilitates migration from the source storage device to the destination storage device;

wherein when the destination storage device is selected for migration it is presumed without validation to be configured to operate as a thin provisioned storage device for storing information and when non-zero information is read from the source storage device it is written by the router to the destination storage device; and wherein the destination storage device configuration to operate as a thin provisioned storage device is validated by the router by reading information from the source storage device and if the read information is zero, then the router reads a corresponding segment of the destination storage device and if non-zero information is read from the corresponding segment, the router sets an indicator indicating that the destination storage device is not configured as the thin provisioned storage device.

8. The system of claim 7, wherein if the information read from the corresponding segment of the destination storage device is all zeros, then no information is written to the destination storage device and the destination storage device configuration as a thin provisioned storage device is validated.

9. The system of claim 7, wherein if information read from the source storage device is zeros, then it is not written to the destination storage device.

10. The system of claim 7, wherein the source storage device and the destination storage device are presented as a logical unit number (LUN) for reading and writing information.

11. A router operationally coupled to a source storage device and a destination storage device for storing information that is migrated from the source storage device to the destination storage device, comprising:

a processor executing code out of a memory for receiving information from the source storage device and if the received information is zero, then reading a corresponding segment of the destination storage device and if non-zero information is read from the corresponding segment, then setting an indicator in the memory indicating that the destination storage device is not configured as the thin provisioned storage device;

wherein the router writes non-zero information read from the source storage device to the destination storage device.

12. The router of claim 11, wherein if the information read from the corresponding segment of the destination storage device is all zeros, then no information is written to the destination storage device and the destination storage device configuration as a thin provisioned storage device is validated by the router.

13. The router of claim 11, wherein the destination storage device is assumed to be a thin provisioned storage device without validation and when non-zero information is read from the source storage device it is written to the destination storage device by the router.

14. The router of claim 11, wherein when information that is read from the source storage device is zeroes, then the zeroes are not written to the destination storage device by the router.

15. The router of claim 11, wherein the source storage device and the destination storage device are presented as a logical unit number (LUN) for reading and writing information.

* * * * *

UNITED STATES PATENT AND TRADEMARK OFFICE
CERTIFICATE OF CORRECTION

PATENT NO. : 8,510,527 B1  
APPLICATION NO. : 12/901409  
DATED : August 13, 2013  
INVENTOR(S) : Bhavik Shah et al.

Page 1 of 1

It is certified that error appears in the above-identified patent and that said Letters Patent is hereby corrected as shown below:

In the Specification

In column 7, line 45, Delete "S6068." and insert -- S606B. --, therefor.

Signed and Sealed this
Twentieth Day of May, 2014

Michelle K. Lee
*Deputy Director of the United States Patent and Trademark Office*